US010650140B2

(12) United States Patent
Kanhere et al.

(10) Patent No.: US 10,650,140 B2
(45) Date of Patent: May 12, 2020

(54) CONTROL-FLOW INTEGRITY WITH MANAGED CODE AND UNMANAGED CODE

(71) Applicant: INTEL CORPORATION, Santa Clara, CA (US)

(72) Inventors: Abhay S. Kanhere, Fremont, CA (US); Paul Caprioli, Hilsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1005 days.

(21) Appl. No.: 14/671,194

(22) Filed: Mar. 27, 2015

(65) Prior Publication Data

US 2016/0283712 A1    Sep. 29, 2016

(51) Int. Cl.
*G06F 21/54* (2013.01)
*G06F 9/50* (2006.01)
*G06F 21/12* (2013.01)
*G06F 21/56* (2013.01)
*G06F 9/48* (2006.01)
(Continued)

(52) U.S. Cl.
CPC .......... *G06F 21/54* (2013.01); *G06F 9/45516* (2013.01); *G06F 9/4856* (2013.01); *G06F 9/5088* (2013.01); *G06F 21/12* (2013.01); *G06F 21/51* (2013.01); *G06F 21/52* (2013.01); *G06F 21/53* (2013.01); *G06F 21/566* (2013.01)

(58) Field of Classification Search
CPC ....................................................... G06F 21/54
See application file for complete search history.

(56) References Cited

U.S. PATENT DOCUMENTS 7,603,704 B2 * 10/2009 Bruening ................ G06F 21/52
726/22
8,136,091 B2 * 3/2012 Erlingsson .............. G06F 21/52
713/151
(Continued)

OTHER PUBLICATIONS

Caprioli, "Return-Target Restrictive Return from Procedure Instructions, Processors, Methods, and Systems", U.S. Appl. No. 14/229,822, filed Mar. 28, 2014, 71 pages.
Zhang et al., "Control Flow Integrity for COTS Binaries", Stony Brook University, Aug. 14, 2013, 16 pages.
Abadi et al., "Control Flow Integrity; Principles, Implementations, and Applications", CCS'05, Nov. 7-11, 2005, Alexandria, Virginia, USA, 14 pages.
(Continued)

*Primary Examiner* — Mohammed Waliullah
(74) *Attorney, Agent, or Firm* — Barnes & Thornburg LLP

(57) ABSTRACT

A data processing system (DPS) supports control-flow integrity (CFI). The DPS comprises a processing element with a CFI enforcement mechanism that supports one or more CFI instructions. The DPS also comprises at least one machine-accessible medium responsive to the processing element. Managed code in the machine-accessible medium is configured (a) to execute in a managed runtime environment (MRE) in the data processing system, and (b) to transfer control out from the MRE to unmanaged code, in response to a transfer control statement in the managed code. The machine-accessible medium also comprises a binary translator which, when executed, converts unmanaged code in the data processing system into hardened unmanaged code (HUC) by including CFI features in the HUC. The CFI features comprise one or more CFI instructions to utilize the CFI enforcement mechanism of the processing element for transfers of control initiated by the HUC. Other embodiments are described and claimed.

16 Claims, 9 Drawing Sheets

(51) Int. Cl.
  *G06F 21/53* (2013.01)
  *G06F 21/51* (2013.01)
  *G06F 21/52* (2013.01)
  *G06F 9/455* (2018.01)

(56) References Cited

U.S. PATENT DOCUMENTS

| | | | |
|---|---|---|---|
| 8,595,832 B1 | 11/2013 | Yee et al. | |
| 2007/0285271 A1 | 12/2007 | Erlingsson et al. | |
| 2009/0282393 A1 | 11/2009 | Costa et al. | |
| 2013/0024676 A1 | 1/2013 | Glew et al. | |
| 2013/0185787 A1* | 7/2013 | Chen | G06F 21/53 726/16 |
| 2013/0283245 A1* | 10/2013 | Black | G06F 8/433 717/130 |
| 2015/0007304 A1* | 1/2015 | Malka | G06F 21/54 726/17 |

OTHER PUBLICATIONS

Wikipedia, "Control Flow" retrieved from https://en.wikipedia.org/wiki/Control_flow, Retrieved on Jan. 21, 2015, 12 pages.

Extended European Search Report for European patent application No. 16773652.9, dated Nov. 23, 2018 (10 pages).

Jason Ansel et al: "Language-independent sandboxing of just-in-time compilation and self-modifying coder," ACM SIGPLAN Notices, vol. 46, No. 6, (Jun. 4, 2011), p. 355.

Caroline Tice et al: "Enforcing Forward-Edge Control-Flow Integrity in GCC & LLVM," Proceedings of the 25th USENIX Security Symposium, Aug. 10-12, 2014.

European Office action for European patent application No. 16773652.9, dated Oct. 22, 2019 (5 pages).

International Search Report and Written Opinion received for PCT Patent Application No. PCT/US2016/019061, dated May 31, 2016, 12 pages.

* cited by examiner

110

| Tag Type | Valid Use | 8-bit Tag Value |
|---|---|---|
| Tag-M | Reserved for managed code | 0x80 – 0xFF |
| Tag-UTM | Reserved for invoking managed code from unmanaged code | 0x7F |
| Tag-MTU | Reserved for invoking unmanaged code from managed code | 0x7E |
| Tag-U | Reserved for unmanaged code | 0x00 – 0x7D |

CONTROL-FLOW INTEGRITY WITH MANAGED CODE AND UNMANAGED CODE

TECHNICAL FIELD

Embodiments described herein relate generally to data processing and in particular to control-flow integrity with managed code and unmanaged code.

BACKGROUND

Malware may take control of a data processing system by altering how control flows in software that is executing on the data processing system. In recent years, control-flow integrity (CFI) hardware mechanisms have been developed to combat malware. For example, software on a data processing system may use the CFI hardware to make sure that control flow has not been altered during execution. CFI hardware may ensure that a control transfer instruction or statement and the corresponding target have the matching tags, for instance.

To take advantage of CFI hardware, software may need to be rewritten, recompiled, or otherwise modified, for instance to incorporate new instructions that invoke the CFI hardware support. However, it may take considerable time and human effort for the developer of the software to modify the software to incorporate CFI features.

Additionally, such modifications may be inadequate to address all control-flow risks, particularly when different types of software are used together. For example, when an untrusted software component is linked with a managed runtime, there is a risk that the untrusted software component will invoke code of the managed runtime that is not supposed to be invoked by the untrusted software component.

BRIEF DESCRIPTION OF THE DRAWINGS

FIG. 2 presents a table of example control-flow integrity tags.

DESCRIPTION OF EMBODIMENTS

Figure 1:
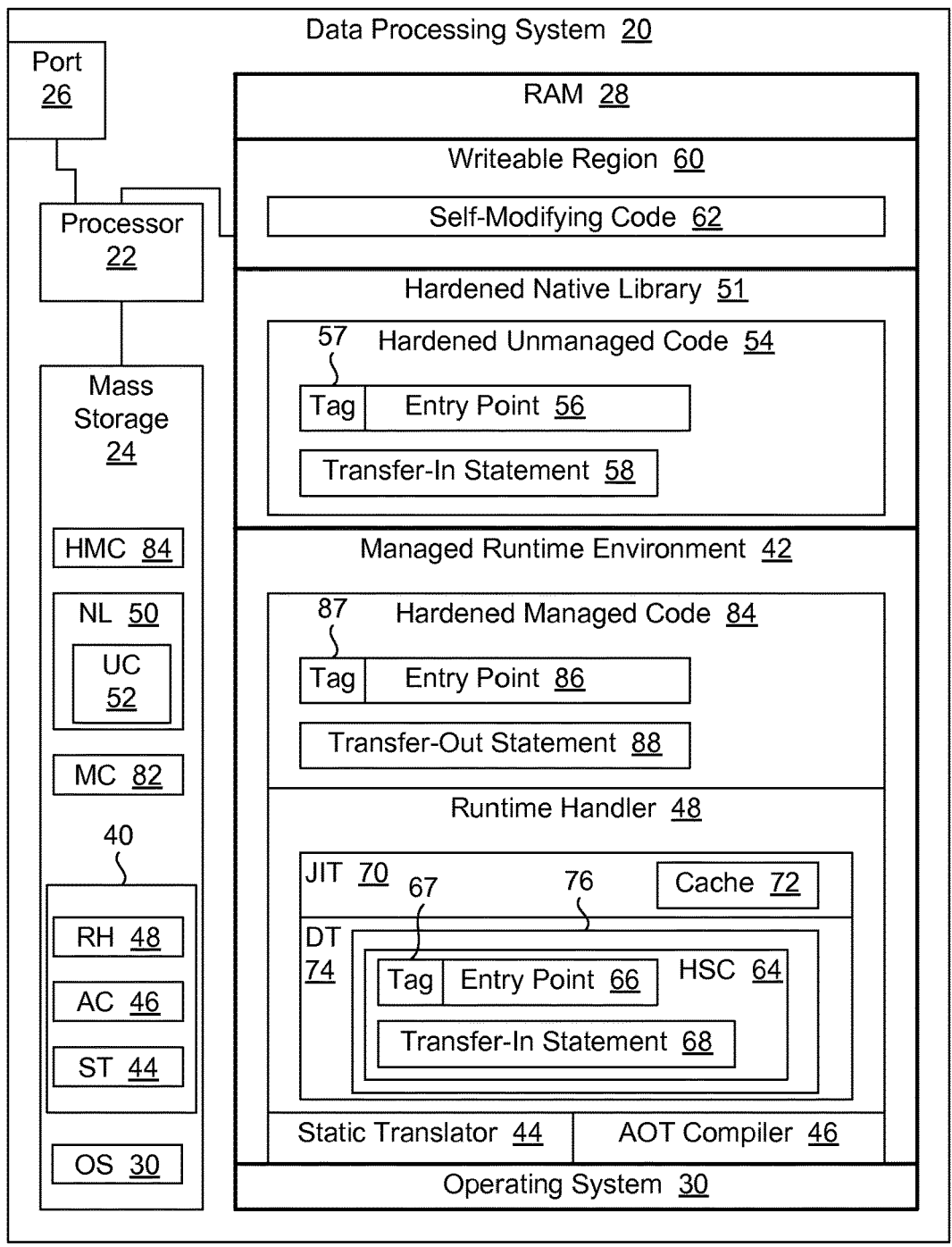
FIG. 1 is a block diagram of an example data processing system with robust control-flow integrity support.
Figure 1:
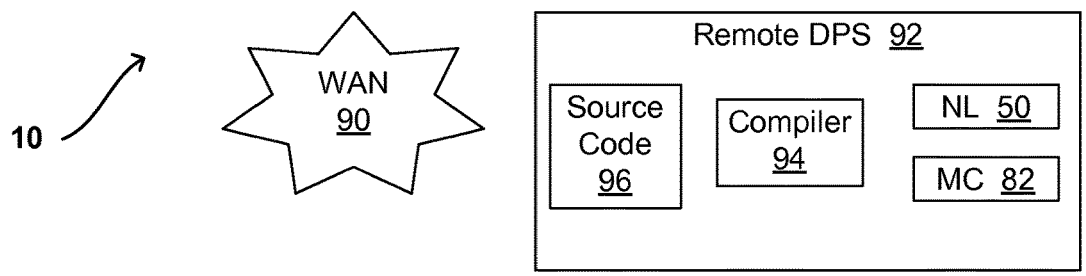

For purposes of illustration, the present disclosure describes one or more example embodiments. However, the present teachings are not limited to those particular embodiments.

Many applications are written to execute within a managed runtime environment (MRE). MREs include the Common Language Runtime (CLR) environment, also referred to as .NET; the Java virtual machine (JVM), also referred to as Java runtime environment (JRE); the Dalvik virtual machine; the Android runtime (ART) environment; etc. For purposes of this disclosure, a program that is written to run within any MRE may be referred to as managed code. By contrast, software that is designed to run outside of an MRE may be referred to as unmanaged code. Also, the software for creating and managing the MRE itself may be referred to as management code or runtime code.

A software provider may deliver (and a data processing system may store) managed code in a format that needs to be compiled or interpreted by the MRE before it can be executed. For purposes of this disclosure, managed code in that format may be referred to as bytecode, no matter which particular MRE the software has been designed for. An MRE may include a just-in-time (JIT) compiler or interpreter to convert bytecode instructions into machine code immediately before executing those instructions.

In addition, some or all of the managed code may be compiled into machine code before it is delivered to or stored in the data processing system of the end user. Additionally or alternatively, the data processing system of the end user may ahead-of-time (AOT) compile some or all of the managed code into machine code, and the MRE may subsequently execute that AOT-compiled managed code. Thus, a data processing system may store some parts of a managed code application as bytecode and other parts as machine code. Accordingly, a data processing system may use a hybrid approach, using a mix of some or all the approaches described herein to provide for robust CFI enforcement.

Furthermore, managed code may rely on code that executes outside of the MRE. For instance, the managed code may rely on one or more libraries of programs that were written as unmanaged code. Such libraries may be referred to as native libraries. The term "runtime application" may be used to refer to a managed code application, along with any native libraries used by that managed code application. A native library may be stored on the end user's data processing system as machine code, for instance in one or more so-called "binary library files" or "object files." Some parts of a native library may be considered to be trusted unmanaged code (e.g., code used for MRE management), and other parts may be considered to be untrusted unmanaged code (e.g., code from the developer of an application to run in the MRE).

Native libraries may be used for functions that require particularly efficient execution, for functions that involve specialized access to hardware resources, etc. For instance, a game developer may provide a game application that involves throwing objects, and the developer may implement most of the game application as managed code, while implementing a function (or multiple functions) for computing projectile trajectories as unmanaged code, thereby allowing the end user's data processing system to compute trajectories more quickly.

The management code, the managed code, and the unmanaged code may all run on top of an operating system that enforces protection using constructs referred to as protection rings, privilege rings, or privilege levels. For instance, a data processing system may execute both managed code and unmanaged code in a user-mode (e.g., ring 3) privilege level. Nevertheless, the MRE may have access to more resources than the unmanaged code, for instance through a file system access control list (ACL). Consequently, controlling access to MRE application programming interfaces (APIs) is critical for overall security of the system.

The developer of managed code may design or modify that code to include features for enforcing control-flow integrity (CFI) using hardware CFI mechanisms. However, for a runtime application that uses managed code and unmanaged code, if CFI is only enforced for the managed code, the application may still face control-flow risks from the unmanaged code. For instance, if an application uses native libraries that do not enforce CFI, it may be necessary to turn off or forego CFI checking whenever control passes from the managed code to the unmanaged code. Even if CFI protection is re-enabled upon return to the managed code, all execution by unmanaged code may lack CFI protection. The unmanaged code may therefore perform undesired or harmful actions. For instance, the unmanaged code may execute managed code routines that aren't actually intended for use by unmanaged code, and thereby obtain access to resources to which were supposed to be off limits for the unmanaged code.

Many runtime applications utilize or include legacy native libraries. Accordingly, the managed code for the runtime application may be modified to utilize hardware mechanisms to enforce CFI, but the related native libraries may remain unprotected.

The present disclosure describes methods and apparatus to provide robust enforcement of CFI in a data processing system, even if the data processing system is executing different types of code (e.g., managed code and unmanaged code).

FIG. 1 is a block diagram of an example data processing system 20 with robust CFI support. For purposes of illustration, this disclosure presents a hypothetical situation involving data processing system 20 executing a runtime application in a way that provides robust CFI protection. In this example situation, the runtime application is a game that involves throwing (virtual) projectiles at (virtual) targets. That runtime application may be referred to as the GameApp.

In the embodiment of FIG. 1, data processing system 20 include at least one processor 22 in communication with various hardware components, such as a communications port 26, mass storage 24, and random access memory (RAM) 28. Processor 22 may provide for hardware enforcement of CFI. For instance, processor 22 may include one or more CFI enforcement mechanisms that support one or more CFI instructions. Such a CFI enforcement mechanism may also be referred to as CFI hardware.

Mass storage 24 may be implemented using any suitable storage technology or combination of storage technologies, including without limitation a hard disk drive (HDD), a solid state drive (SSD), read-only memory (ROM), and/or other types of non-volatile or volatile storage technologies. Mass storage 24 includes various sets of instructions that may be loaded into RAM 28 and executed by processor 22. Those sets of instructions include an operating system (OS) 30, management code 40, and the components of the GameApp such as managed code (MC) 82 and native library (NL) 50. As described in greater detail below, management code 40 includes various software modules for creating and managing an MRE 42.

As indicated below, local data processing system 20 may be implemented as a portable or handheld computing device, such as a smartphone or a tablet, for instance, or as any other suitable type of computing device. Data processing system 20 may also be referred to as a local data processing system (DPS) 20.

The embodiment of FIG. 1 also involves a remote DPS 92 that is managed by a software developer or distributor. Remote DPS 92 may include hardware features that are generally similar to those illustrated in local DPS 20.

In the hypothetical situation, the developer of the GameApp used one or more compilers 94 in remote DPS 92 to compile a source code 96 version for the GameApp into a bytecode version. The bytecode version may be referred to as managed code 82. In addition, the developer used the one or more compilers to generate one or more native libraries 50 to be used by managed code 82. Native library 50 includes unmanaged code 52.

An end user then used local DPS 20 to download the GameApp (e.g., managed code 82 and native library 50) from remote DPS 92. Local DPS 20 may communicate with remote DPS 92 via a wide area network (WAN) 90 (e.g., the Internet), a local area network (LAN), a personal area network (PAN), and/or any other suitable network or combination of networks. Cooperating data processing systems like local DPS 20 and remote DPS 92 may be referred to collectively as a distributed data processing system 10. Alternatively, the end user may obtain the GameApp on a storage medium such as an optical disk, a flash drive, etc.

As described in greater detail below, data processing system 20 may then modify the GameApp (including managed code 82 components and native library 50 components) to provide for robust CFI enforcement. For instance, data processing system 20 may verify that the GameApp includes appropriate CFI features (e.g., proper CFI tag values for entry points), and if those features are not already present, data processing system 20 may automatically add them. For purposes of this disclosure, code that has been verified and/or modified to provide for hardware enforcement of CFI may be referred to as hardened.

For instance, data processing system 20 may use a preprocessor such as an AOT compiler 46 to harden managed code 82 while converting the bytecode to machine code, and data processing system 20 may use a static translator 44 to harden unmanaged code 52 from native library 50, which may be in machine code format both before and after hardening.

The hypothetical situation therefore involves using AOT compiler 46 to harden the GameApp. In other situations, however, the developer may use a compiler (e.g., compiler 94) with features like those described herein with regard to AOT compiler 46 to add CFI features to the managed code and/or the unmanaged code before delivering the GameApp to the end user. In addition or alternatively, local DPS 20 may use a JIT compiler 70 with features like those described herein with regard to AOT compiler 46 to harden a bytecode version of the GameApp during execution.

In FIG. 1, the original (unhardened) version of managed code 82 is shown in mass storage 24, and the hardened managed code (HMC) 84 is shown in RAM 28. Similarly, the original (unhardened) version of native library 50 with unmanaged code (UC) 52 is shown in mass storage 24, and the hardened native library (HNL) 51 with hardened unmanaged code (HUC) 54 is shown in RAM 28.

Mass storage 24 may also include management code 40. Management code 40 may include, for instance, static translator (ST) 44, AOT compiler (AC) 46, and a runtime handler (RH) 48.

As described in greater detail below, data processing system 20 may use static translator 44 to perform binary translation of native library 50, and during that process static translator 44 may add CFI features to unmanaged code 52 in native library 50, thereby converting the original unmanaged code 52 into HUC 54 and the original native library 50 into HNL 51. For instance, static translator 44 may add appropriate CFI tags. More information on CFI tags is provided below, for example in connection with FIG. 2.

As described in greater detail below, data processing system 20 may use AOT compiler 46 to convert a bytecode version of managed code 82 into a machine code version, and during that process AOT compiler 46 may harden the managed code by making sure that the machine code version includes CFI features. Thus, AOT compiler 46 may convert original managed code 82 into HMC 84. HMC 84 may also be referred to as AOT managed code 84.

Data processing system 20 may execute static translator 44, AOT compiler 46, runtime handler 48, HMC 84, and HNL 51 as user-level or user-mode applications or programs on top of OS 30.

Runtime handler 48 may include components such as a JIT compiler or interpreter 70, a dynamic translator (DT) 74, a garbage collector, etc.

Depending on circumstances, data processing system 20 may use JIT compiler 70 instead of AOT compiler 46 or in addition to AOT compiler 46 to convert original managed code 82 into HMC 84. JIT compiler 70 may include a code cache 72 for storing some of all of HMC 84. If data processing system 20 uses AOT compiler 46 (e.g., when the GameApp is first installed), data processing system 20 may then save HMC 84 in mass storage 24 for use whenever the user launches the GameApp. However, if data processing system 20 uses JIT compiler 70 instead, data processing system may need to regenerate HMC 84 each time the GameApp is executed.

In addition, data processing system 20 may use dynamic translator 74 to perform binary translation of self-modifying code (SMC) 62. During that process, dynamic translator 74 may, in effect, convert SMC 62 into hardened SMC (HSC) 64. For instance, whenever HMC 84 generates SMC 62 within writeable region 60, and/or whenever HMC 84 attempts to transfer control to an entry point within writeable region 60, dynamic translator 74 may automatically shadow that code (in hardened form) in a translation cache 76, as described in greater detail below. (Translation cache 76 may also be referred to as code cache 76.) Dynamic translator 74 may thus shadow all of the SMC generated by HUC 54, and dynamic translator 74 may make sure that the shadow version of the SMC (i.e., HSC 64) includes CFI features (e.g., transfer instructions that invoke CFI and CFI tags on entry points). Accordingly, the shadow code 64 in code cache 76 may be referred to as hardened.

When generating HSC 64, dynamic translator 74 may also generate a checksum for SMC 62. And when HUC 54 subsequently transfers control to the SMC, a code stub in HUC 54 may use that checksum to determine whether SMC 62 has been changed. That code stub may be referred to as an SMC stub. In other embodiments, instead of using a checksum, SMC stubs may use different techniques to determine whether SMC has changed.

If SMC 62 has been changed, the SMC stub may automatically update HSC 64 accordingly, before allowing control to be transferred to the SMC. Once the SMC stub has made sure that HSC 64 is up to date, the SMC stub may generate a code trampoline, and the SMC stub may then use that code trampoline to transfer control to the destination within HSC 64 that corresponds to the destination in SMC 62 specified by HUC 54. The SMC stub may write the code trampoline to code cache 76, for example. Further details for an example code trampoline are provided below.

Different software components may run from different regions of memory. For instance, as indicated by the thick lines separating the different components within RAM 28, OS 30 may run from a first region; static translator 44, AOT compiler 46, runtime handler 48, and HMC 84 may run from a second region; HUC 54 may run from a third region; and SMC 62 may run from a fourth region. Furthermore, the first three regions may be configured as write protected, but the fourth region may be configured as writeable, as described in greater detail below. Accordingly, FIG. 1 illustrates the fourth region as a writeable region 60.

As indicated or suggested above, hardened code includes features for enforcing CFI using hardware CFI mechanisms. Such features may include CFI tags embedded within the code, as well as CFI instructions within the code. The CFI instructions may invoke hardware CFI mechanisms which allow control to flow to a designated destination only if that destination has the proper CFI tag. Those CFI instructions may include, for instance:

JZ_TAG, tag, target with "JZ_TAG" denoting an operation to jump, if the result of the last comparison was zero, to the target location target, after the CFI hardware verifies that the instruction or statement at the target location has a CFI tag with the value tag. And if the target location does not have the proper CFI tag, the CFI hardware is to abort execution and/or to raise or trigger an error condition denoting a CFI violation.

The CFI hardware may also support similar CFI instructions as counterparts for some or all other conventional control-flow statements, whether conditional or unconditional. For instance, with regard to x86 instructions, the CFI hardware may support CFI counterpart instruction for control-flow instructions that include, without limitation: JUMP (JMP), JUMP ZERO (JZ), JUMP NON-ZERO (JNZ), JUMP EQUAL (JE), JUMP NOT EQUAL (JNE), JUMP BELOW (JB), JUMP OVERFLOW (JO), JUMP PARITY (JP), CALL, RETURN (RET), JUMP_INDIRECT (JMP_INDIRECT), CALL_INDIRECT, etc.

Like the JZ_TAG instruction referenced above, the CFI counterparts may include an opcode suffix (e.g., "_TAG"), a tag parameter, an address parameter, etc. For instance, the CFI counterpart for RET may include a tag parameter. As another example, the CFI counterpart for JMP_INDIRECT may include a tag parameter and an address parameter, where the address parameter points to a location (e.g., a register) that is supposed to contain the destination address.

In embodiments using other architectures (e.g., SPARK, MIPS, ARM, IA64, etc.), control-flow instructions and corresponding CFI counterpart instructions may use different syntaxes.

In the embodiment of FIG. 1, the CFI hardware to execute CFI instructions resides in processor 22. Accordingly, data processing system 20 may use CFI hardware and corresponding CFI tags to enforce CFI while the GameApp is executing.

Moreover, in the embodiment of FIG. 1, management code 40 is also hardened. In other words, the software components of management code 40 (e.g., static translator 44, AOT compiler 46, runtime handler 48, etc.) are compiled and distributed with CFI tags and CFI instructions, to prevent CFI breaches during execution.

When a typical data processing system executes software, it usually executes the instructions or statements in sequence. In other words, control typically flows down through the instructions of a program in sequence, from each instruction to the next. However, some statements or instructions cause control to be transferred to somewhere other than the next instruction. Such statements or instructions may be referred to as control-flow statements or transfer statements. For instance, an internal transfer statement can cause control (a) to transfer or loop back to an earlier statement of the executing program or (b) to transfer or jump forward to a later statement in the program. Similarly, an external transfer statement can cause control to transfer from one program to another program altogether.

For purposes of this disclosure, an external transfer statement that causes control to transfer in to MRE 42 from outside of MRE 42 may be referred to as a transfer-in statement, while an external transfer statement that causes control to transfer from MRE 42 out to a program outside of MRE 42 may be referred to as a transfer-out statement.

For purposes of illustration, FIG. 1 shows a transfer-out statement 88 in HMC 84, a transfer-in statement 58 in HUC 54, and a transfer-in statement 68 in SMC 62.

The software in data processing system 20 may have various different entry points for methods to be invoked, for functions to be called, or for otherwise transferring control. For example, HMC 84 may have an entry point 86, and HUC 54 may have an entry point 56. HUC 54 may also create SMC 62 with one or more entry points.

In addition, as described in greater detail below, each entry point may be given a CFI tag, and the CFI hardware may use those CFI tags to enforce control-flow integrity. For instance, FIG. 1 shows a tag 87 for entry point 86, and a tag 57 for entry point 56.

In addition, when dynamic translator 74 creates HSC 64 for code cache 76, dynamic translator 74 may give each entry point 66 for HSC 64 a tag 67. For purposes of this disclosure, the term "tag" should be understood as referring to a CFI tag unless the context clearly requires a different understanding.

As described in greater detail below, the CFI instructions and CFI hardware make sure that each entry point has a CFI tag before allowing control to be transferred to that entry point. Furthermore, in at least one embodiment, different kinds of CFI tags are used to provide protection for different kinds of transfers.

FIG. 2 presents a table 110 of example CFI tags. In particular, table 110 shows four different types of tags: Tag-M, for transfers from managed code to managed code; Tag-UTM, for transfers from unmanaged code to managed code; Tag-MTU, for transfers from managed code to unmanaged code, and Tag-U, for transfers from unmanaged code to unmanaged code. In the example embodiment, the tags occupy 8 bits. Also, any value from the range from 0x00 through 0x7D may be used for Tag-Us. Any value from the range from 0x80 through 0xFF may be used for Tag-Ms. The value 0X7F is used for all Tag-UTMs. And the value 0X7E is used for all Tag-MTUs. However, other embodiments may use different approaches. For instance, other embodiments may use a different tag size, different ranges of values, etc.

Figure 3:
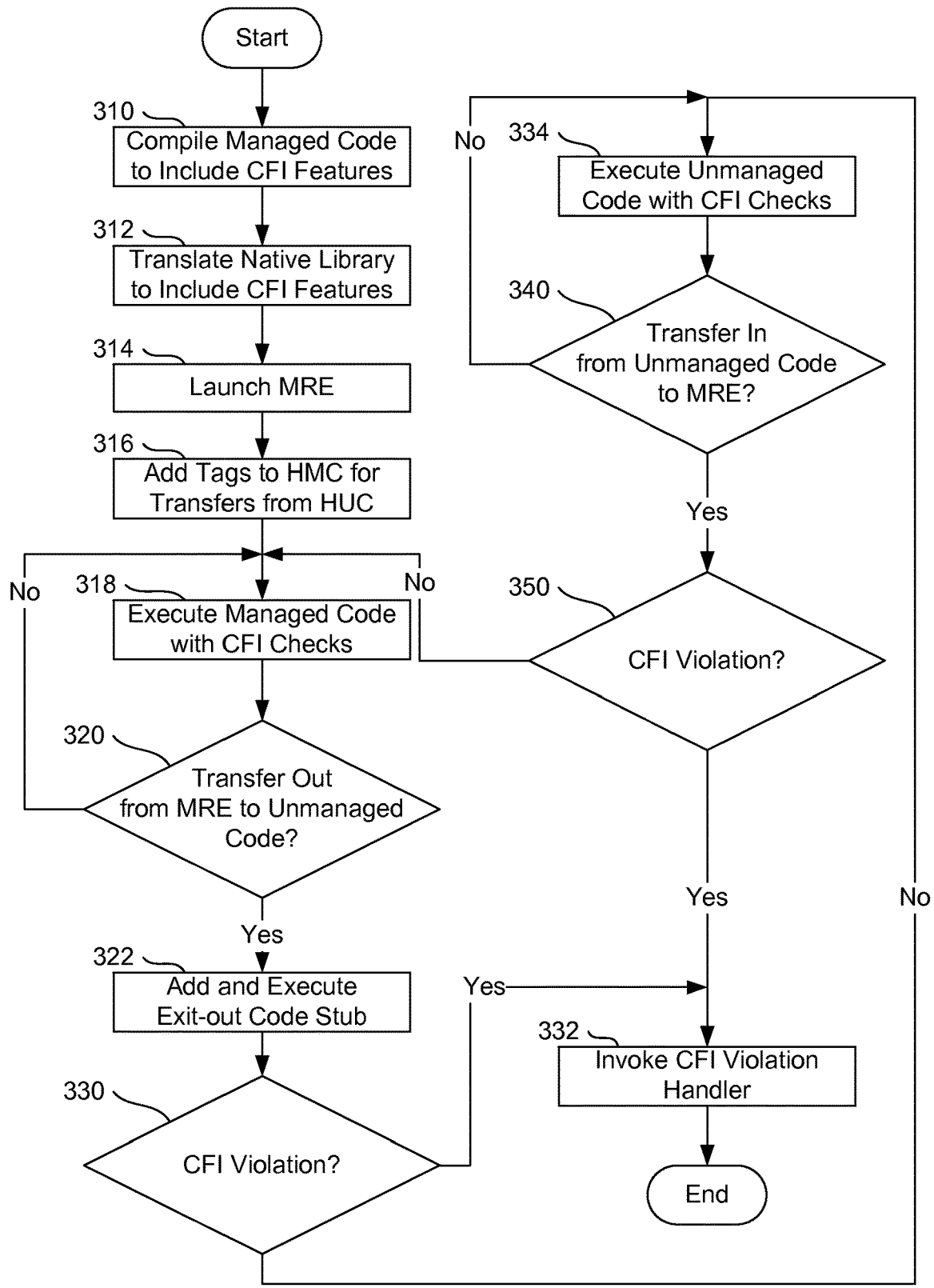
FIG. 3 presents a flowchart of an example process for enforcing control-flow integrity.

FIG. 3 presents a flowchart of an example process for enforcing control-flow integrity. That process starts at block 310 with managed code 82 for the GameApp being compiled to include CFI features. For instance, when the developer writes source code 96, the developer may include CFI features in source code 96. In addition or alternatively, when compiler 94 compiles source code 96 into managed code 82, compiler 94 may automatically incorporate CFI features into managed code 82. In addition or alternatively, as described immediately below, AOT compiler 46 may automatically check whether managed code 82 includes CFI features, and if those features are missing, AOT compiler 46 may automatically add them.

Figure 4A:
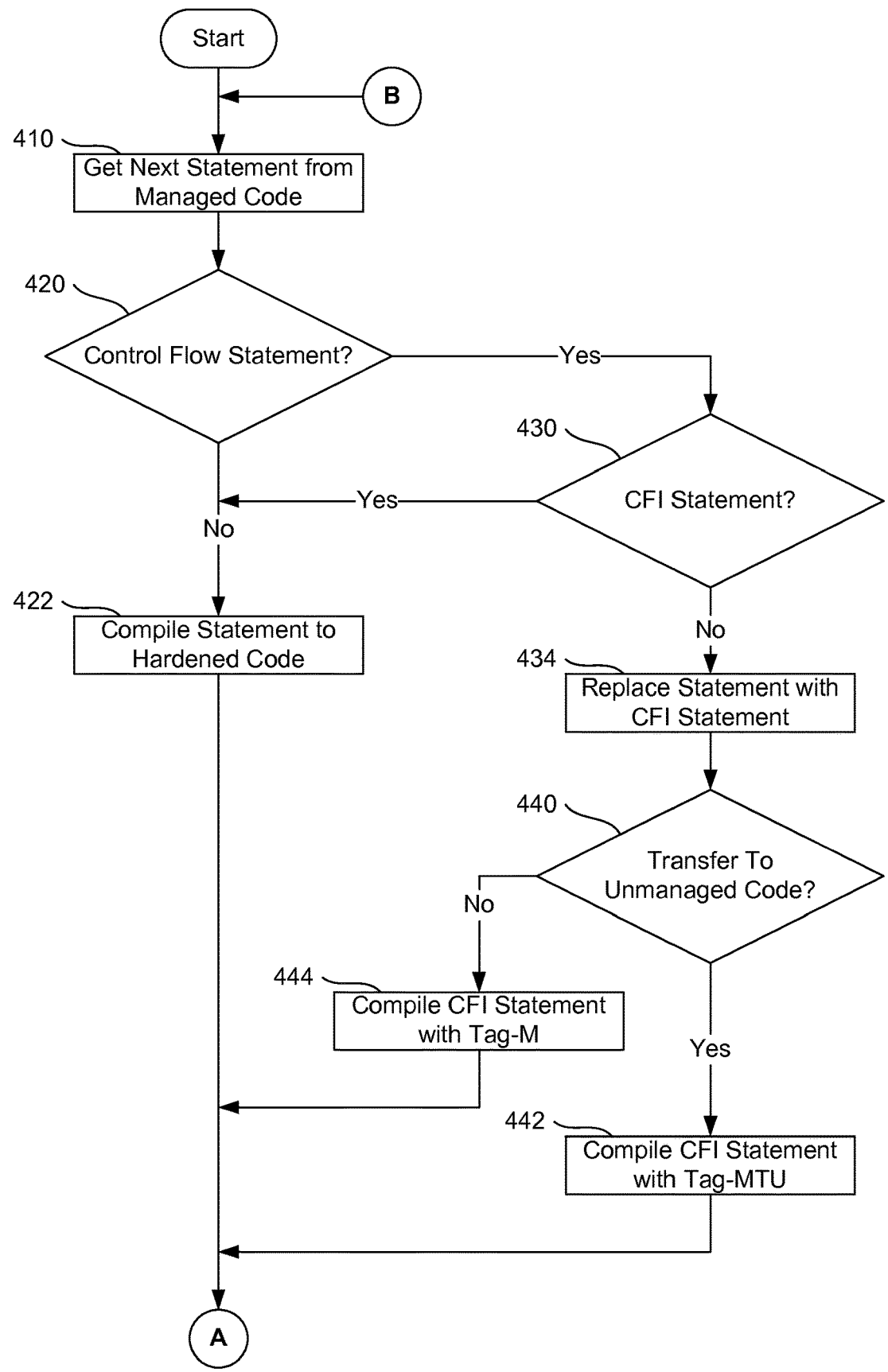
FIGS. 4A and 4B present a flowchart of an example process for generating managed code with control-flow integrity features.
Figure 4B:
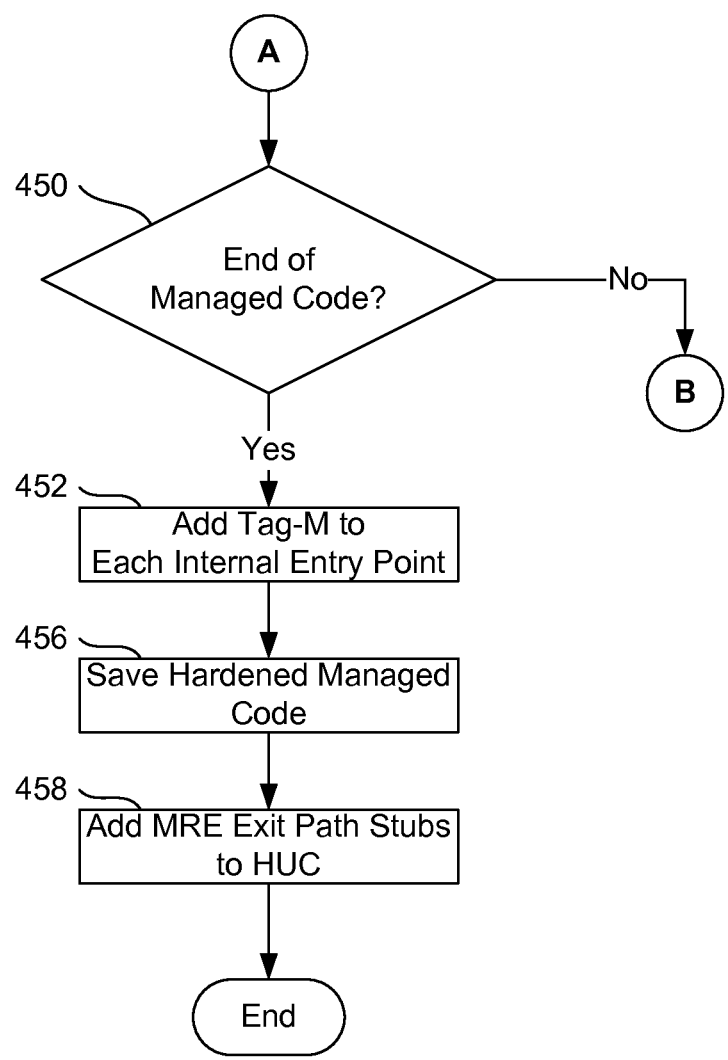

FIGS. 4A and 4B present a flowchart of an example process for generating managed code with CFI features. This process corresponds to block 310 of FIG. 3. FIGS. 4A and 4B are described with regard to a hypothetical situation in which data processing system 20 uses AOT compiler 46 to harden code. In one embodiment, data processing system 20 automatically uses AOT compiler 46 to generate HMC 84 as part of the process of installing the GameApp. However, as indicated above, the same kind of process may be used, with suitable variations, to harden code with compiler 94 and/or JIT compiler 70. For instance, wherein the description below refers to managed code 82, a similar process in compiler 94 may instead involve source code 96, etc.

As shown at block 410, the process of FIG. 4A may start with AOT compiler 46 reading the next statement (or at initiation, the first statement) for the GameApp from managed code 82. Once that statement has been read, it may be referred to as the current statement. As indicated at block 420, AOT compiler 46 may then determine whether the current statement is a control-flow statement. If the current statement is not a control-flow statement, AOT compiler 46 may simply compile the current statement into HMC 84, as shown at block 422. For instance, AOT compiler 46 may generate one or more machine code statements for HMC 84, wherein that/those machine code statement(s) corresponds to the current bytecode statement.

But if the current statement is a control-flow statement, AOT compiler 46 may then determine whether the current statement is a CFI statement, as shown at block 430. If the current statement is a CFI statement, AOT compiler 46 may compile that CFI statement to HMC 84, as shown at block 422.

However, if the current statement is a control-flow statement but not a CFI statement, AOT compiler 46 may determine which CFI statement corresponds to the control-flow statement and, in effect, replace the control-flow statement with that corresponding CFI statement, as shown at block 434. In addition, as shown at block 440, AOT compiler 46 may determine whether the control-flow statement is a call to an unmanaged method (or any other transfer out of the MRE to unmanaged code). If the statement is transfer out to unmanaged code, AOT compiler 46 may add a Tag-MTU to the CFI statement and then compile that CFI statement to HMC 84, as shown at block 442. If the statement is not a call to an unmanaged method (e.g., if it is a call to a managed method), AOT compiler 46 may add a Tag-M to the CFI statement and then compile that CFI statement to HMC 84, as shown at block 444.

The process may then pass through page connector A to FIG. 4B. AOT compiler 46 may then determine whether it has reached the end of managed code 82, as shown at block 450. If not, the process may pass back to FIG. 4A via page connector B, and AOT compiler 46 may process any remaining statement as indicated above.

Once all of the statements have been compiled, AOT compiler 46 may add a Tag-M to each entry point in HMC 84 that should be accessible from within the MRE, as shown at block 452. Those entry points may include destinations for calls to internal methods and such. Those entry points may also include statements that are to receive control upon return from calls to internal methods, such as the statement immediately following a call. As shown at block 456, AOT compiler 46 may then save HMC 84 to mass storage 24.

In addition, as shown at block 458, AOT compiler 46 may add one or more code stubs to HUC 54 to support transfers from HMC 84 to HUC 54. Such a code stub may be referred to as an exit-path stub, and AOT compiler 46 may give each exit-path stub a Tag-MTU. Also, as described in greater detail below with regard to FIG. 3, runtime handler 48 may subsequently create additional code stubs to work with the exit-path stubs. Those stubs may be referred to as exit-out stubs, and runtime handler 48 may give each of them a Tag-M.

The process of FIG. 4B may then end.

In the situation described above, managed code 82 is bytecode. In another situation, the managed code is machine code. Nevertheless, AOT compiler 46 and/or JIT compiler 70 may analyze that machine code to ensure that the CFI checks are correct and follow certain predetermined rules and conventions. AOT compiler 46 and/or JIT compiler 70 may automatically add CFI features, as necessary, thereby generating HMC based on the managed code, substantially as described above.

Referring again to FIG. 3, data processing system 20 may also use static translator 44 to translate native library 50 into HNL 51, as shown at block 312. Data processing system 20 may automatically perform that translation as part of the process of installing the GameApp onto data processing system 20, for instance, or as part of the process of launching or starting the GameApp. If static translator 44 creates HNL 51 as part of the process of installing the GameApp into data processing system 20, static translator 44 may store a copy of HNL 51 in mass storage 24, possibly in place of native library 50.

Figure 5A:
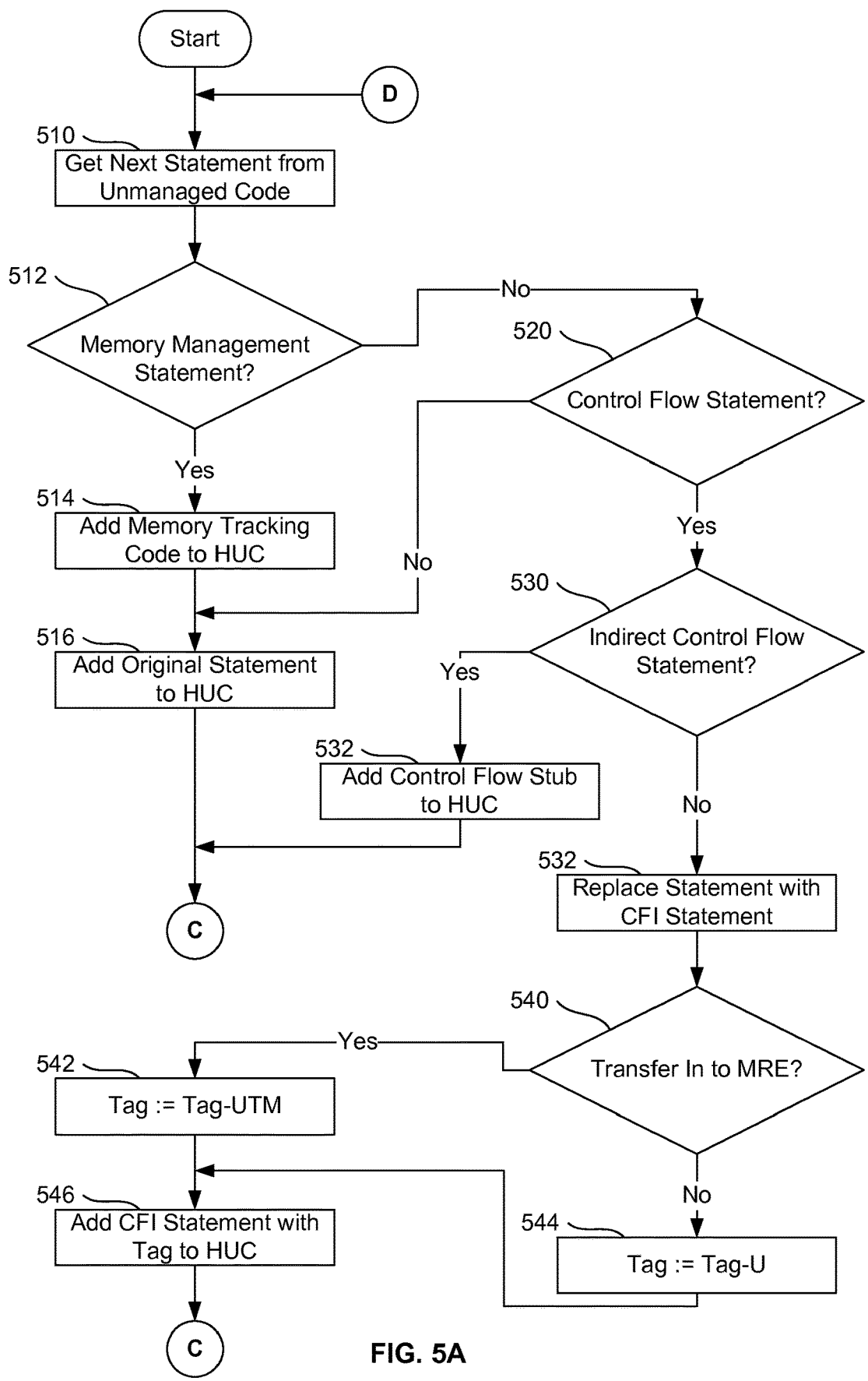
FIGS. 5A and 5B present a flowchart of an example process for modifying unmanaged code to enforce control-flow integrity.
Figure 5B:
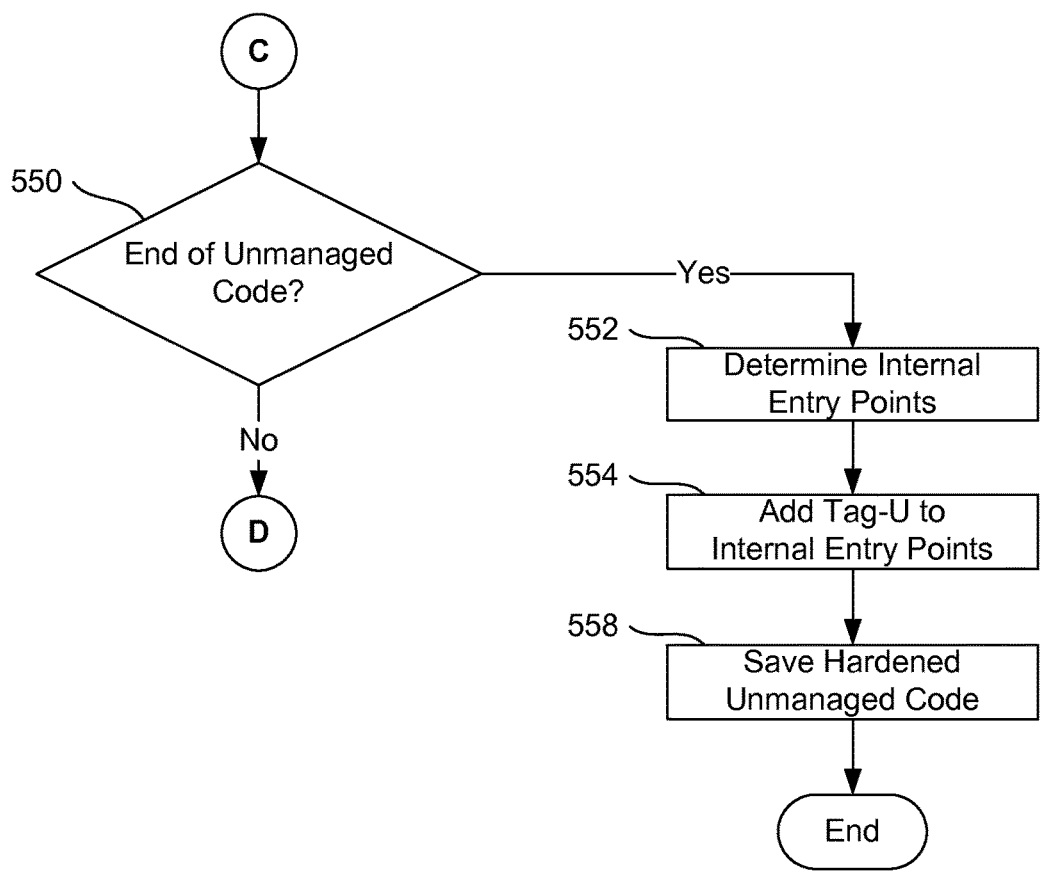

FIGS. 5A and 5B present a flowchart of an example process for modifying unmanaged code 52 from native library 50 to incorporate CFI features, thereby generating HMC 54 for HNL 51. This process corresponds to block 312 of FIG. 3. The process of FIG. 5A may start with static translator 44 reading the next statement (or, at initiation, the first statement) from the original unmanaged code 52 in native library 50, as shown at block 510. Once that statement has been read, it may be referred to as the current statement.

Static translator 44 may then determine whether the current statement is a memory management statement, as shown at block 512. If it is, static translator 44 may insert code into HUC 54 to track memory settings, as shown at block 514. For instance, that memory tracking code may create and manage a table (and/or other data structures) that indicates which region (or regions) of memory has been configured as writeable by HUC 54 and/or which have been configured as write protected by HUC 54. As shown at block 516, static translator 44 may then copy the current statement from original unmanaged code 82 to HUC 54. The process may then pass through page connector C to FIG. 5B.

However, referring again to block 512, if the current statement is not a memory management statement, static translator 44 may determine whether the current statement is a control-flow statement, as shown at block 520. If the current statement is a control-flow statement, static translator 44 may determine whether the current statement is an indirect control-flow statement, as shown at block 530. For purposes of this disclosure, an indirect control-flow statement is a control-flow statement that does not directly specify the destination to receive control. Instead, the indirect control-flow statement specifies how the destination is to be determined at runtime. For instance, an indirect control-flow statement may specify a location (e.g., a register) from which the destination is to be extracted at runtime. Accordingly, it may not be possible to determine the destination before executing the code.

If the current statement is an indirect control-flow statement, static translator 44 may add a control-flow stub to HUC 54, as shown at block 532. That control-flow stub may be referred to as an indirect stub, and the entry point for that stub may include a Tag-U. Further details for an example indirect stub are provided below, with regard to FIGS. 6A and 6B.

After static translator 44 adds the indirect stub, the process may pass through page connector C to FIG. 5B.

However, if the current statement is a control-flow statement but not an indirect control-flow statement, static translator 44 may determine which CFI statement corresponds to the current control-flow statement and, in effect, replace the original control-flow statement with that corresponding CFI statement, as shown at block 532. In addition, static translator 44 may determine whether the control-flow statement denotes a transfer in to an MRE, as shown at block 540. If the control-flow statement denotes a transfer in to an MRE from unmanaged code, static translator 44 may assign a tag value of Tag-UTM to the tag parameter for the CFI statement to be added to HUC 54, as shown at block 542. If the control-flow statement does not denote a transfer in to an MRE from unmanaged code (e.g., if the control-flow statement denotes an internal transfer within the unmanaged code), static translator 44 may assign a tag value of Tag-U to the tag parameter for the CFI statement, as shown at block 544. As shown at block 546, static translator 44 may then add the CFI statement with the proper tag to HUC 43. The process may then pass through page connector C to FIG. 5B.

As shown at block 550, static translator 44 may then determine whether it has reached the end of unmanaged code 52. If it has not reach the end, the process may return to FIG. 5A via page connector D, and the rest of unmanaged code 52 may be processed, as indicated above.

If static translator 44 has processed all of the statements in unmanaged code 52, static translator 44 may then determine all of the internal entry points within HUC 54, as shown at block 552. For instance, static translator 44 may build a control-flow graph to determine which statements perform calls, which are targets, which are to receive control on return from a call, etc. As shown at block 554, static translator 44 may then add a Tag-U to each of those entry points.

As shown at block 558, static translator 44 may then save HUC 54 to mass storage 24. The process of FIG. 5B may then end.

For example, static translator 44 may use the process described above to translate original code illustrated by the following pseudocode.

```
ADD eax, 0x02;
CMP eax, edx;
JZ 0x1010;
1010: ADD ebx, 0x01;
```

Based on such original code, static translator 44 may generate translated code illustrated by the following pseudocode.

```
ADD eax, 0x02;
CMP eax, edx;
JZ_TAG 0x1025, 0x07; // 0x07 is a valid value for a Tag-U
1025: 0x07 ADD ebx, 0x01; // This target has the tag value 0x07
```

As indicated, static translator 44 gives the statement at the destination location a tag value that is within the range reserved for unmanaged code, and static translator 44 gives the JZ_TAG instruction a tag parameter value (0x07) that matches the value of the tag at the destination location.

Referring again to FIG. 3, data processing system 20 may then launch MRE 42, as shown at block 314. For instance, data processing system 20 may launch MRE 42 in response to the user starting the GameApp by launching HMC 84. HMC 84 may then register, with runtime handler 48, all managed code entry points that should be accessible from unmanaged code 52, and in response, runtime handler 48 may automatically add a Tag-UTM to each of those entry points, as shown at block 316. Those entry points may also include statements that are to receive control upon return from calls to external methods, such as the statement immediately following such a call.

As shown at block 318, data processing system 20 may then execute HMC 84, and that code may provide for CFI enforcement, as indicated above. In addition, as shown at block 320, runtime handler 48 may automatically detect whether the instruction to be executed involves a transfer to a destination outside of MRE 42.

If so, as indicated at block 322, runtime handler 48 may automatically create and execute an exit-out code stub, to transfer control to unmanaged code 52. In other words, runtime handler 48 may create and execute an exit-out code stub in response to executing or detecting a transfer instruction in HMC 84 with a destination outside of MRE 42. Runtime handler 48 may add exit-out code stubs to HMC 84, and they may execute within MRE 42. Accordingly, runtime handler 48 may give each exit-out code stub a Tag-M. Runtime handler 48 may utilize an exit-out code stub to transfer to a corresponding exit-path stub. Runtime handler 48 may thus redirect the transfer of the instruction to be executed so that, rather than directly transferring out of MRE 42, control instead transfers to an exit-out stub, which may then direct the transfer to a corresponding exit-path stub outside of MRE 42, which may then transfer control to the original destination outside of MRE 42.

The exit-out and exit-path stubs may include code for marshalling/converting arguments/parameters over to an appropriate form for communication between MRE 42 and the unmanaged or native execution environment. Runtime handler 48 may generate such an exit-out stub for each unmanaged code entry point associated with the GameApp by management code 82. Thus, all exits out of MRE 42 may be performed via well-defined code that is created by management code 40 (e.g., created by AOT compiler 46).

Similarly, for interpreted code, JIT compiler 70 may have a well-defined exit code sequence that may include adding an exit-path stub with Tag-MTU to HUC 54 and then transferring to that stub.

An exit-out stub may be expressed with the following pseudocode:

```
Tag-M exit_out_stub ....
    Marshall_Parameters;
    JMP_TAG Tag-MTU, exit_path_stub;
``` where exit_path_stub denotes the entry point of the corresponding exit-path stub.

An exit-path stub may be expressed with the following pseudocode:

```
Tag-MTU exit_path_stub ....
    Unmarshall_Parameters;
    CALL_TAG Tag-M, [native_code_ptr];
``` where native_code_ptr denotes the entry point of the final destination in HMC 84.

As shown at block 330, when HMC 84 executes control-flow statements to transfer out from MRE 42 to HUC 54 (possibly including intermediate transfers to exit-out and exit-path stubs), data processing system 20 then determines whether any transfer violates CFI. For instance, the CFI hardware may determine whether the destination has a CFI tag that matches the CFI tag specified by the control-flow statement. If a CFI violation is detected, data processing system 20 may automatically invoke an appropriate error handling mechanism, as shown at block 332. For instance, OS 30 may include a CFI violation handler that automatically terminates the GameApp in response to any CFI violation. However, if the transfer does not violate CFI, data processing system then executes HUC 54, as shown at block 334, and HUC 54 also provides for CFI enforcement, as indicated above.

As shown at block 340 and 350, if HUC 54 executes a control-flow statement to transfer in from HUC 54 to MRE 42, data processing system 20 then determines whether that transfer violates CFI. For instance, as indicated above, the CFI hardware may determine whether the destination has a CFI tag that matches the CFI tag specified by the control-flow statement. If a CFI violation is detected, data processing system 20 may invoke a corresponding error handler, as shown at block 332. However, if the transfer does not violate CFI, data processing system then executes HMC 84, as shown at block 318. Data processing system 20 may then continue to execute HMC 84 and HUC 54 until a CFI violation occurs or the user exits the GameApp.

The flowchart of FIG. 3 illustrates that both HMC 84 and HUC 54 provide for CFI enforcement. For instance, FIG. 3 shows that CFI is enforced for transfers from HMC 84 to HUC 54 and vice versa. However, HMC 84 may also provide for CFI enforcement for transfers from one part of HMC 84 to another part of HMC 84, as well as transfers from one part of HUC 54 to another part of HUC 54.

For example, as indicated above, HMC 84 and HUC 54 may both include CFI instructions that use the CFI hardware of data processing system 20 to make sure that the entry point for any external transfer has an appropriate CFI tag. For instance, the CFI instructions and hardware may trigger a CFI violation of an entry point does not have the correct type of tag, as indicated in FIG. 2.

Figure 6A:
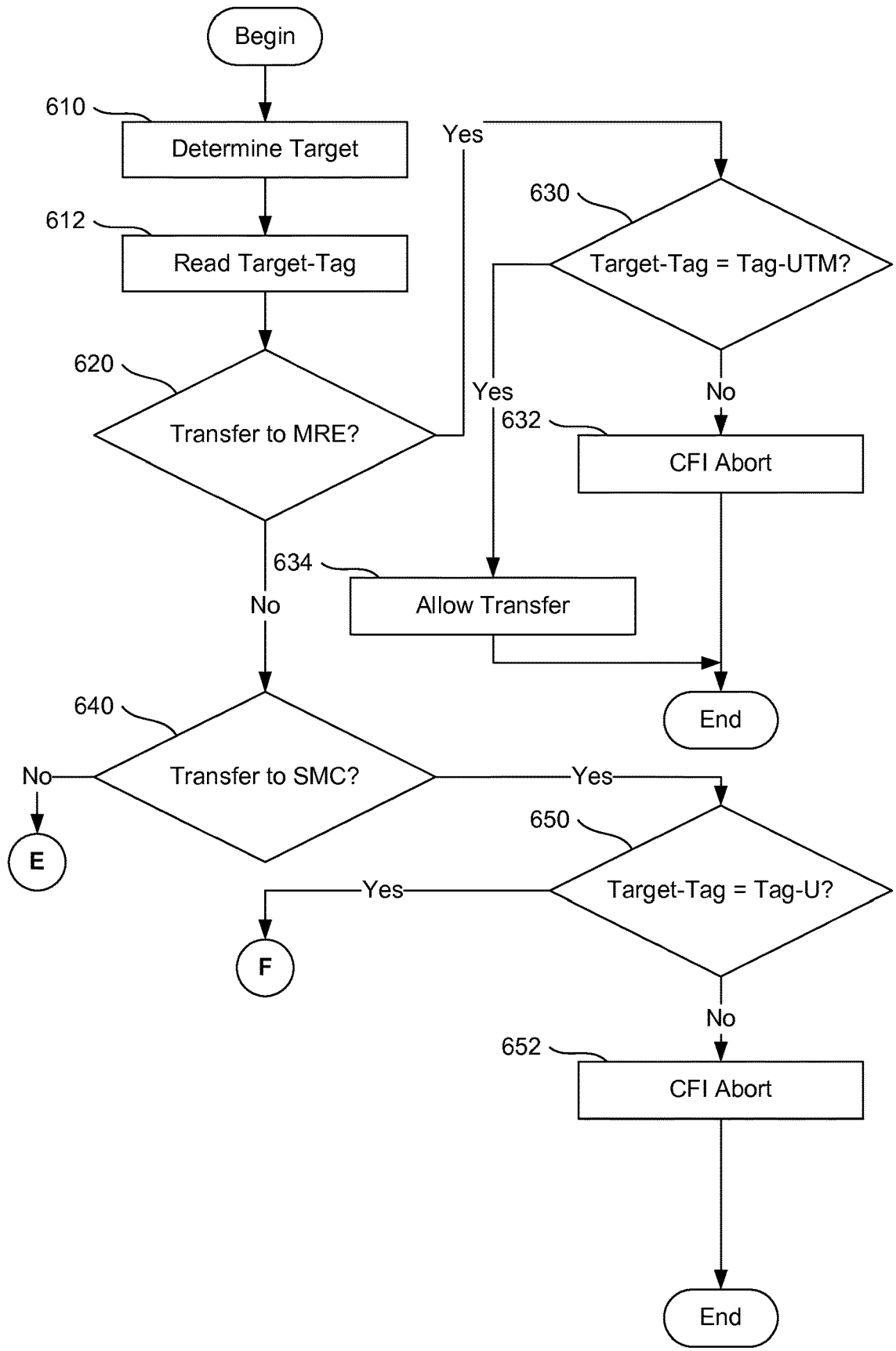
FIGS. 6A and 6B present a flowchart of an example process for enforcing control-flow integrity for indirect control-flow statements.
Figure 6B:
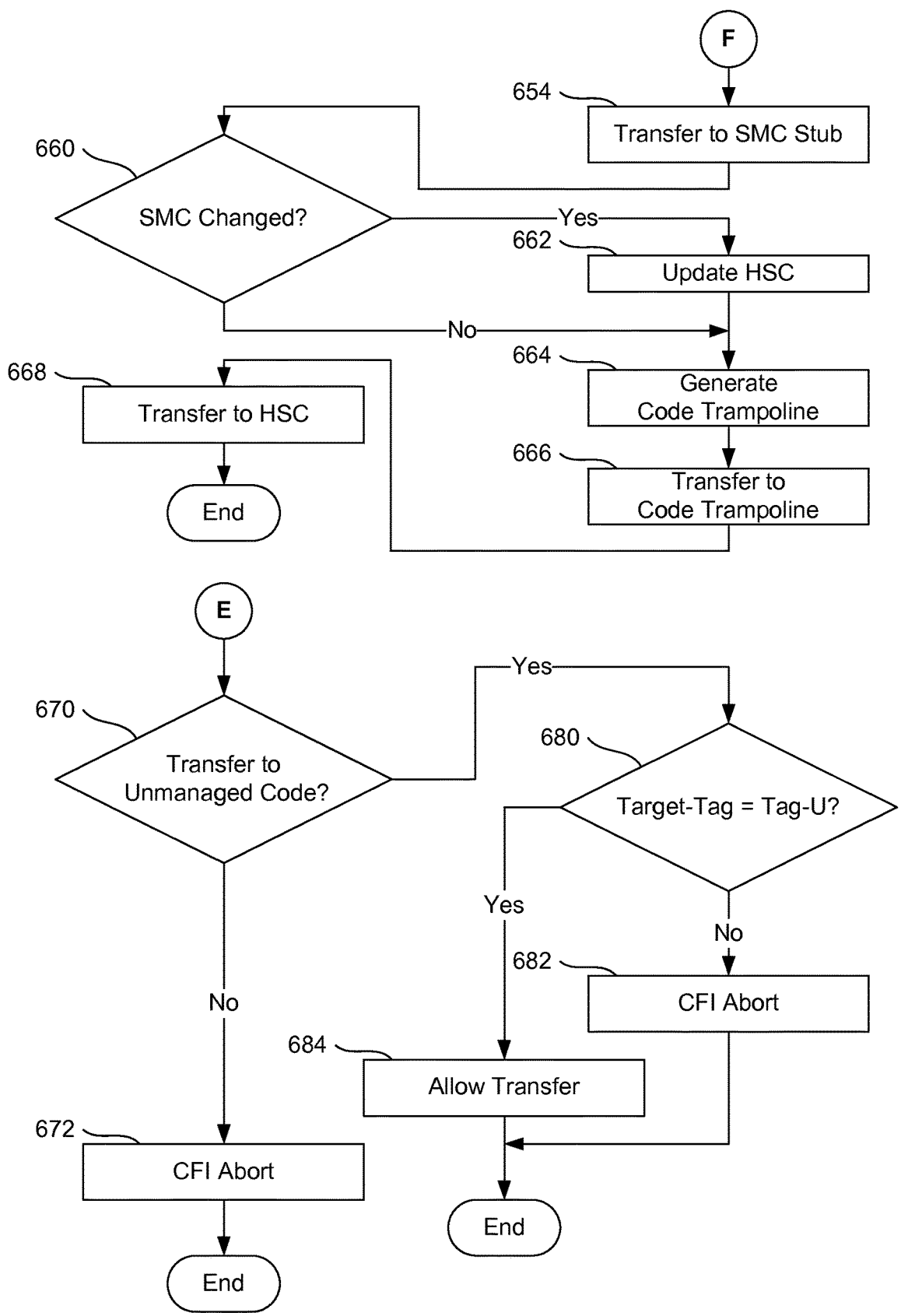

FIGS. 6A and 6B present a flowchart of an example process for enforcing control-flow integrity for indirect control-flow statements. As indicated above, static translator 44 may insert an indirect stub into HUC 54 for each indirect control-flow statement that cannot be resolved by static translator 44. That stub may be referred to as an indirect stub, and it may use an API exposed by MRE 42 to prevent execution of any unauthorized managed routines from HUC 54. The API allows the indirect stub to obtain certain kinds of information from MRE 42, such as the value of tags for entry points specified by the stub. The API may be provided by runtime handler 48, for example.

In one embodiment, the indirect stub is machine code to implement the process illustrated in FIGS. 6A and 6B. As shown at block 610, the indirect stub may start by determining the target/destination for the relevant control-flow statement in HUC 54. The indirect stub may then read the value of the CFI tag at that destination/location, as shown at block 612. As shown at block 620, the indirect stub may then determine whether the target is within MRE 42. For instance, the indirect stub may determine if the target is within the memory region associated with MRE 42. If the target of the control-flow statement is within MRE 42, the indirect stub may determine whether the CFI tag at the target location is a Tag-UTM, as shown at block 630. For instance, the indirect stub may determine whether the value of that tag is 0x7F, or the indirect stub may use a CFI instruction that will automatically trigger a CFI violation if the target does not have a Tag-UTM.

If the target has a Tag-UTM tag, the indirect stub may complete the transfer, as shown at block 634, and execution may proceed within MRE 42, for instance as shown at block 318 of FIG. 3. However, if the target does not have the proper tag, the indirect stub may abort execution and/or trigger a CFI error, as indicated at block 632 of FIG. 6A.

However, referring again to block 620, if the indirect control-flow statement does not involve a transfer to MRE 42, the indirect stub may determine whether the indirect control-flow statement involves a transfer to SMC 62, as shown at block 640. For instance, the indirect stub may determine that the transfer is to SMC 62 if the target is within a memory region that is configured as writeable. If the transfer is to SMC 62, the indirect stub may then determine whether the CFI tag at the target location is within the range of values allowed for tags of type Tag-U, as shown at block 650.

If the target does not have the proper tag, the indirect stub may abort execution and/or trigger a CFI error, as indicated at block 652. However, if the target has a Tag-U tag, the process may pass through page connector F to FIG. 6B, and the indirect stub may transfer control to the SMC stub, as shown at block 654. As shown at block 660 and indicated above, the SMC stub may then determine whether SMC 62 has been changed. For instance, the SMC stub may calculate a checksum for the current contents of SMC 62 and may compare that value to a previously calculated checksum for SMC 62. Alternatively, as indicated above, the SMC stub may use any other suitable technique for determining whether SMC 62 has been changed. If SMC 62 has been changed, the SMC stub may automatically update HSC 64 to shadow the current contents, as shown at block 662. For example, the SMC stub may use dynamic translator 74 to translate the new contents of SMC 62 into HSC 64 with appropriate CFI tags and instructions.

When the SMC stub makes those updates to HSC 64, the SMC stub may save data to link the original entry points and CFI tags in HSC 64 to the corresponding new entry points and CFI tags in HSC 64. For purposes of this disclosure, the parameters SMCTargetAddress and SMCTargetTag may be used to denote an original entry point and a corresponding original CFI tag in SMC 62, respectively; and the parameters HSCTargetAddress and HSCTargetTag may be used to denote a corresponding entry point and a corresponding CFI tag in HSC 64.

As shown at block 664, the SMC stub may then generate a code trampoline to facilitate a transfer to HSC 64 with CFI enforcement. The SMC stub may write the code trampoline to code cache 76, for example, and the SMC stub may give the code trampoline a Tag-U. That tag may be denoted by the parameter TrampolineTag. The SMC stub may create the code trampoline using operations like those described by the following pseudocode, for example:

```
TrampolineTag GenerateCodeTrampoline( SMCTargetAddress,
    HSCTargetAddress, HSCTargetTag )
{
    // Get address of trace in code cache that was dynamically binary
    // translated (DBT) to correspond to the code at the specified
    address in SMC.
    HSCTargetAddress = GetAddressOfDBTTraceStartingAt
      ( SMCTargetAddress );
    // Get CFI tag for the HSC Target.
    HSCTargetTag =
      GetTagFromDBTTraceStartingAt( SMCTargetAddress );
    // Allocate writeable memory for trampoline in code cache.
    byte* p = AllocateMemory( SIZE_FOR_TRAMPOLINE );
    // Write the CFI tag for the code trampoline.
    Write_Byte( Tag-U );
    // Write the code trampoline. Specifically, write the opcode
    // JMP_TAG and the parameters HSCTargetAddress and
    // HSCTargetTag in the code cache, starting at 'p'.
    Write_Opcode_To( p, JMP_TAG HSCTargetAddress,
      HSCTargetTag; )
    Return p; // Return the entry point for the code trampoline.
}
```

As shown at block 666, the SMC stub may then use a CFI instruction and the TrampolineTag to transfer control to the code trampoline. For instance, the SMC stub may transfer control to the code trampoline by executing the following pseudocode:

```
JMP_TAG TrampolineTag, [p];
// where p is the address of the trampoline code returned by the
GenerateCodeTrampoline routine.
```

As shown at block 668, the code trampoline may then use a CFI instruction and the HSCTargetTag to transfer control to the HSCTargetAddress (i.e., the destination within HSC 64 that corresponds to the destination in SMC 62 specified by HUC 54).

However, referring again to block 640 of FIG. 6A, if the indirect control-flow statement does not involve a transfer to SMC 62, the process may pass through page connector E to FIG. 6B, and the indirect stub may determine whether the indirect control-flow statement involves a transfer to HUC 54, as shown at block 670. For instance, the indirect stub may determine that the transfer is to HUC 54 if the target is within the memory region associated with HUC 54. If the transfer is to HUC 54, the stub may determine whether the CFI tag at the target location is a valid Tag-U, as shown at block 680.

If the target does not have the proper tag, the indirect stub may abort execution and/or trigger a CFI error, as indicated at block 682. However, if the target has a Tag-U tag, the indirect stub may transfer control to the target within HUC 54, using a CFI instruction and the CFI tag provided by the indirect call, as shown at block 684.

However, referring again to block 670, if the transfer is not directed to HUC 54 (or to SMC 62, or to MRE 42), the stub may abort execution and/or trigger a CFI error, as shown at block 672.

Thus, static translator 44 may convert the indirect control-flow statement from the original unmanaged code into an indirect stub in HUC 54 that provides for CFI enforcement. The operations of the indirect stub may also be described in terms of pseudocode as follows:

```
GET( Target ); // Get target address of indirect control transfer instruction.
READ( TargetTag, Target ); // Read CFI-tag at target.
If Invalid_CFI_Tag( TargetTag ) { // if the CFI-tag value is invalid
    CFI_abort( ); // CFI violation triggered !!.
}
entering_MRE = IsAddressInMRERange( Target );
```

-continued

```
entering_Unmanaged_code = IsAddressInHNLRange( Target );
entering_SMC_code = IsAddressWritableCode( Target );
If( entering_MRE && IsReservedEntryTag( TargetTag ) ) {
    TransferTo( Target );
} else if ( entering_SMC_code && IsValidUCTag( Target-tag)) {
    // Generate code trampoline that jumps with matching CFI tag in
    translation cache.
    p = GenerateCodeTrampoline(Target, NewTarget, NewTag );
    JMP_TAG TrampolineTag, [p]; // Jump to NewTarget (with NewTag)
    via Code Trampoline.
} else if (entering_Unmanaged_code &&
IsValidUnmanagedCodeTag( TargetTag ) ){
    Jump to Target with Target-tag.
}else {
    CFI_abort( ); // CFI violation triggered !!.
}
IsReservedEntryTag( tag ) returns TRUE if tag is Tag-UTM.
IsValidUnmanagedCodeTag( tag ) returns TRUE if tag is in TAG-U range.
```

As has been described, one or more data processing systems may include features for using hardware CFI mechanisms to enforce CFI for managed code, for unmanaged code, and for self-modifying code, even if the code uses indirect transfers.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

For instance, in one embodiment, the binary translators may use the same Tag-U value (e.g., 0x03) for all internal transfer destinations within the unmanaged code and for all transfers within the unmanaged code to those destinations. In another embodiment, the binary translators may use the same Tag-U value at the entry point for all defined functions, and for the calls to those functions, while using one or more different Tag-U values for other types of destinations.

Any suitable operating environment and programming language (or combination of operating environments and programming languages) may be used to implement components described herein. The present teachings may also be used to advantage in many different kinds of data processing systems. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with features for enforcing CFI. The data processing system comprises a processing element with a CFI enforcement mechanism that supports one or more CFI instructions and at least one machine-accessible medium responsive to the processing element. The machine-accessible medium comprises managed code configured (a) to execute in a managed runtime environment (MRE) in the data processing system, and (b) to transfer control out from the MRE to unmanaged code, in response to a transfer control statement in the managed code, The machine-accessible medium also comprises a binary translator which, when executed, converts unmanaged code in the data processing system into hardened unmanaged code (HUC) by including CFI features in the HUC, wherein the CFI features comprise one or more CFI instructions to utilize the CFI enforcement mechanism of the processing element for transfers of control initiated by the HUC.

Example A2 is a data processing system according to Example A1, and further comprising a preprocessor in the machine-accessible medium, wherein the preprocessor, when executed, converts managed code in the data processing system into hardened managed code (HMC) by ensuring that the HMC includes CFI features.

Example A3 is a data processing system according to Example A2, wherein the HMC is configured to use at least one of the CFI features in the HMC when transferring control from the MRE to the HUC.

Example A4 is a data processing system according to Example A3, wherein the operation using at least one of the CFI feature in the HMC when transferring control from the MRE to the HUC comprises (a) using an MRE-to-unmanaged (MTU) CFI tag to transfer control out from the MRE to an exit-path code stub, wherein the exit-path code stub comprises a matching MTU CFI tag; and (b) using an unmanaged CFI tag to transfer control from the exit-path code stub to a destination address in the HUC.

Example A5 is a data processing system according to Example A1, further comprising a dynamic binary translator in the machine-accessible medium, wherein the dynamic binary translator, when executed, converts self-modifying code (SMC) produced by the HUC into hardened SMC (HSC) by including CFI features in the HSC. Example A5 may also include the features of any one or more of Examples A2 through A4.

Example A6 is a data processing system according to Example A5, wherein the dynamic binary translator is configured to save the HSC in the data processing system in a translation cache. Example A6 may also include the features of any one or more of Examples A2 through A4.

Example A7 is a data processing system according to Example A6, further comprising a code stub to be executed in response to a transfer control statement involving a transfer from the HUC to SMC. When executed, the code stub, (a) automatically determines whether the SMC has been changed since the SMC was translated into HSC; (b) in response to a determination that the SMC has been changed, automatically updates the HSC in the translation cache to shadow the SMC; and (c) after updating the HSC to shadow the SMC, allows control to be transferred from the HUC to the HSC. Example A7 may also include the features of any one or more of Examples A2 through A4.

Example A8 is a data processing system according to Example A1, wherein the CFI features comprise at least one item from the group consisting of (a) a CFI instruction that uses CFI hardware to automatically check CFI before completing a transfer of control; and (b) a CFI tag associated with an entry point, wherein the CFI tag allows the CFI instruction to determine whether the entry point is acceptable. Example A8 may also include the features of any one or more of Examples A2 through A7.

Example A9 is a data processing system according to Example A8, wherein the CFI features comprise at least three items from the group consisting of (a) at least one MRE CFI tag to denote an acceptable entry point for a transfer from managed code to managed code; (b) at least one unmanaged CFI tag to denote an acceptable entry point for a transfer from unmanaged code to unmanaged code; (c) at least one MRE-to-unmanaged (MTU) CFI tag to denote an acceptable entry point for a transfer from managed code to unmanaged code; and (d) at least one unmanaged-to-MRE (UTM) CFI tag to denote an acceptable entry point for a transfer from unmanaged code to managed code. Example A9 may also include the features of any one or more of Examples A2 through A7.

Example A10 is a data processing system according to Example A1, wherein the managed code comprises code capable of running in at least one environment from a group consisting of (a) a Java runtime environment (JRE), (b) a Common Language Runtime (CLR) environment, (c) a Dalvik virtual machine, and (d) an Android runtime (ART) environment. Example A10 may also include the features of any one or more of Examples A2 through A9.

Example B1 is an apparatus with features to enforce CFI. The apparatus comprises at least one machine-accessible medium and a binary translator in the machine-accessible medium. When executed by a processor in a data processing system, the binary translator converts unmanaged code in the data processing system into hardened unmanaged code (HUC) by including CFI features in the HUC. The CFI features comprise one or more CFI instructions which utilize a CFI enforcement mechanism of the processor for transfers of control initiated by the HUC. The at least one machine-accessible medium also comprises managed code configured (a) to execute within a managed runtime environment (MRE) in the data processing system and (b) to transfer control out from the MRE to the HUC, in response to a transfer control statement in the managed code.

Example B2 is an apparatus according to Example B1, further comprising a preprocessor in the machine-accessible medium, wherein the preprocessor, when executed, converts managed code in the data processing system into hardened managed code (HMC) by ensuring that the HMC includes CFI features.

Example B3 is an apparatus according to Example B2, wherein the HMC is configured to use at least one of the CFI features in the HMC when transferring control from the MRE to the HUC.

Example B4 is an apparatus according to Example B3, wherein the operation using at least one of the CFI feature in the HMC when transferring control from the MRE to the HUC comprises (a) using an MRE-to-unmanaged (MTU) CFI tag to transfer control out from the MRE to an exit-path code stub, wherein the exit-path code stub comprises a matching MTU CFI tag; and (b) using an unmanaged CFI tag to transfer control from the exit-path code stub to a destination address in the HUC.

Example B5 is an apparatus according to Example B1, further comprising a dynamic binary translator in the machine-accessible medium, wherein the dynamic binary translator, when executed, converts self-modifying code (SMC) produced by the HUC into hardened SMC (HSC) by including CFI features in the HSC. Example B5 may also include the features of any one or more of Examples B2 through B4.

Example B6 is an apparatus according to Example B5, wherein the dynamic binary translator is configured to save the HSC in a translation cache. Example B5 may also include the features of any one or more of Examples B2 through B4.

Example B7 is an apparatus according to Example B6, further comprising a code stub to be executed in response to a transfer control statement involving a transfer from the HUC to SMC, wherein the code stub, when executed (a) automatically determines whether the SMC has been changed since the SMC was translated into HSC; (b) in response to a determination that the SMC has been changed, automatically updates the HSC in the translation cache to shadow the SMC; and (c) after updating the HSC to shadow the SMC, allows control to be transferred from the HUC to the HSC. Example B7 may also include the features of any one or more of Examples B2 through B4.

Example B8 is an apparatus according to Example B1, wherein the CFI features comprise at least one item from the group consisting of (a) a CFI instruction that uses CFI hardware to automatically check CFI before completing a transfer of control; and (b) a CFI tag associated with an entry point, wherein the CFI tag allows the CFI instruction to determine whether the entry point is acceptable. Example B8 may also include the features of any one or more of Examples B2 through B7.

Example B9 is an apparatus according to Example B1, wherein the CFI features comprise at least three items from the group consisting of (a) at least one MRE CFI tag to denote an acceptable entry point for a transfer from managed code to managed code; (b) at least one unmanaged CFI tag to denote an acceptable entry point for a transfer from unmanaged code to unmanaged code; (c) at least one MRE-to-unmanaged (MTU) CFI tag to denote an acceptable entry point for a transfer from managed code to unmanaged code; and (d) at least one unmanaged-to-MRE (UTM) CFI tag to denote an acceptable entry point for a transfer from unmanaged code to managed code. Example B9 may also include the features of any one or more of Examples B2 through B8.

Example B10 is an apparatus according to claim 11, wherein the managed code comprises code capable of running in at least one environment from a group consisting of (a) a Java runtime environment (JRE); (b) a Common Language Runtime (CLR) environment; (c) a Dalvik virtual machine; and (d) an Android runtime (ART) environment. Example B10 may also include the features of any one or more of Examples B2 through B9.

Example C1 is a method for enforcing CFI. The method comprises (a) using binary translation to convert unmanaged code in a data processing system into hardened unmanaged code (HUC) by including CFI features in the HUC; (b) using a preprocessor to convert managed code in the data processing system into hardened managed code (HMC) by ensuring that the HMC includes CFI features; (c) executing the HMC in a managed runtime environment (MRE) in the data processing system; (d) transferring control out from the MRE to the HUC, in response to a transfer control statement in the HMC; and (e) using the CFI enforcement features in the HUC for transfers of control initiated by the HUC. The CFI features provide for hardware enforcement of CFI.

Example C2 is a method according to Example C1, further comprising using dynamic binary translation to convert self-modifying code (SMC) produced by the HUC into hardened SMC (HSC) by including CFI features in the HSC.

Example C3 is a method according to Example C2, further comprising saving the HSC in a translation cache.

Example C4 is a method according to Example C3, further comprising, (a) when executing HUC that includes a transfer control statement which would cause a transfer to SMC, automatically determining whether the SMC has been changed since the SMC was translated into HSC; (b) in response to a determination that the SMC has been changed, automatically updating the HSC in the translation cache to shadow the SMC; and (c) after updating the HSC to shadow the SMC, transferring control from the HUC to the HSC.

Example C5 is a method according to Example C1, wherein the operation of transferring control out from the MRE to the HUC comprises using at least one of the CFI features in the HMC when transferring control from the MRE to the HUC. Example C5 may include the features of any one or more of Examples C2 through C4.

Example C6 is a method according to Example C5, wherein the operation using at least one of the CFI feature in the HMC when transferring control from the MRE to the HUC comprises (a) using an MRE-to-unmanaged (MTU) CFI tag to transfer control out from the MRE to an exit-path code stub, wherein the exit-path code stub comprises a matching MTU CFI tag; and (b) using an unmanaged CFI tag to transfer control from the exit-path code stub to a destination address in the HUC. Example C6 may include the features of any one or more of Examples C2 through C4.

Example C7 is a method according to Example C1, wherein the CFI features comprise at least one item from the group consisting of (a) a CFI instruction that uses CFI hardware to automatically check CFI before completing a transfer of control; and (b) a CFI tag associated with an entry point, wherein the CFI tag allows the CFI instruction to determine whether the entry point is acceptable. Example C7 may include the features of any one or more of Examples C2 through C6.

Example C8 is a method according to Example C7, wherein the CFI features comprise at least three items from the group consisting of (a) at least one MRE CFI tag to denote an acceptable entry point for a transfer from managed code to managed code; (b) at least one unmanaged CFI tag to denote an acceptable entry point for a transfer from unmanaged code to unmanaged code; (c) at least one MRE-to-unmanaged (MTU) CFI tag to denote an acceptable entry point for a transfer from managed code to unmanaged code; and (d) at least one unmanaged-to-MRE (UTM) CFI tag to denote an acceptable entry point for a transfer from unmanaged code to managed code. Example C8 may include the features of any one or more of Examples C2 through C6.

Example C9 is a method according to Example C1, wherein the managed code comprises code capable of running in at least one environment from a group consisting of (a) a Java runtime environment (JRE); (b) a Common Language Runtime (CLR) environment; (c) a Dalvik virtual machine; and (d) an Android runtime (ART) environment. Example C9 may include the features of any one or more of Examples C2 through C8.

Example D is at least one machine-accessible medium comprising computer instructions for enforcing CFI. The computer instructions, in response to being executed on a data processing system, enable the data processing system to perform a method according to any of Examples C1 through C9.

Example E is a data processing system with support for CFI. The data processing system comprises a processing element, at least one machine-accessible medium responsive to the processing element, and computer instructions stored at least partially in the at least one machine-accessible medium. In response to being executed, the computer instructions enable the data processing system to perform a method according to any of Examples C1 through C9.

Example F is a data processing system with support for CFI. The data processing system comprises means for performing the method of any one of Examples C1 through C9.

What is claimed is:

1. A data processing system with features for enforcing control-flow integrity, the data processing system comprising:
    a hardware processing element comprising hardware circuitry for hardware control-flow integrity (CFI) enforcement that supports one or more CFI instructions;
    at least one machine-accessible medium responsive to the hardware processing element;
    managed code in the machine-accessible medium, wherein the managed code is configured (a) to execute in a managed runtime environment (MRE) in the data processing system, and (b) to transfer control out from the MRE to unmanaged code, in response to a transfer control statement in the managed code;
    a binary translator in the machine-accessible medium, wherein the binary translator, when executed, converts unmanaged code in the data processing system into hardened unmanaged code (HUC) by including CFI features in the HUC, wherein the CFI features comprise one or more CFI instructions to utilize the hardware circuitry for CFI enforcement of the hardware processing element for transfers of control initiated by the HUC; and
    a preprocessor in the machine-accessible medium, wherein the preprocessor, when executed, converts managed code in the data processing system into hardened managed code (HMC) by ensuring that the HMC includes CFI features,
    wherein, when transferring control from the MRE to the HUC, the HMC is configured to (i) use an MRE-to-unmanaged (MTU) CFI tag to transfer control out from the MRE to an exit-path code stub, wherein the exit-path code stub comprises a matching MTU CFI tag and (ii) to use an unmanaged CFI tag to transfer control from the exit-path code stub to a destination address in the HUC.

2. The data processing system according to claim 1, further comprising:
    a dynamic binary translator in the machine-accessible medium, wherein the dynamic binary translator, when executed, converts self-modifying code (SMC) produced by the HUC into hardened SMC (HSC) by including CFI features in the HSC.

3. The data processing system according to claim 2, wherein the dynamic binary translator is configured to save the HSC in the data processing system in a translation cache.

4. The data processing system according to claim 3, further comprising:
    a code stub to be executed in response to a transfer control statement involving a transfer from the HUC to SMC, wherein the code stub, when executed:
    automatically determines whether the SMC has been changed since the SMC was translated into HSC;
    in response to a determination that the SMC has been changed, automatically updates the HSC in the translation cache to shadow the SMC; and
    after updating the HSC to shadow the SMC, allows control to be transferred from the HUC to the HSC.

5. The data processing system according to claim 1, wherein the CFI features comprise at least one item from the group consisting of:
    a CFI instruction that uses CFI hardware to automatically check CFI before completing a transfer of control; and
    a CFI tag associated with an entry point, wherein the CFI tag allows the CFI instruction to determine whether the entry point is acceptable.

6. The data processing system according to claim 5, wherein the CFI features comprise at least three items from the group consisting of:
    at least one MRE CFI tag to denote an acceptable entry point for a transfer from managed code to managed code;
    at least one unmanaged CFI tag to denote an acceptable entry point for a transfer from unmanaged code to unmanaged code;
    at least one MRE-to-unmanaged (MTU) CFI tag to denote an acceptable entry point for a transfer from managed code to unmanaged code; and
    at least one unmanaged-to-MRE (UTM) CFI tag to denote an acceptable entry point for a transfer from unmanaged code to managed code.

7. The data processing system according to claim 1, wherein the managed code comprises code capable of running in at least one environment from a group consisting of:
    a Java runtime environment (JRE);
    a Common Language Runtime (CLR) environment;
    a Dalvik virtual machine; and
    an Android runtime (ART) environment.

8. An apparatus with features to enforce control-flow integrity, the apparatus comprising:
    at least one machine-accessible medium;
    a binary translator in the machine-accessible medium;
    wherein the binary translator, when executed by a hardware processor in a data processing system, converts unmanaged code in the data processing system into hardened unmanaged code (HUC) by including control-flow integrity (CFI) features in the HUC; and
    wherein the CFI features comprise one or more CFI instructions which utilize hardware circuitry for CFI enforcement of the hardware processor for transfers of control initiated by the HUC;

managed code in the at least one machine-accessible medium, wherein the managed code is configured (a) to execute within a managed runtime environment (MRE) in the data processing system and (b) to transfer control out from the MRE to the HUC, in response to a transfer control statement in the managed code; and a preprocessor in the machine-accessible medium, wherein the preprocessor, when executed, converts managed code in the data processing system into hardened managed code (HMC) by ensuring that the HMC includes CFI features, wherein, when transferring control from the MRE to the HUC, the HMC is configured to (i) use an MRE-to-unmanaged (MTU) CFI tag to transfer control out from the MRE to an exit-path code stub, wherein the exit-path code stub comprises a matching MTU CFI tag and (ii) to use an unmanaged CFI tag to transfer control from the exit-path code stub to a destination address in the HUC.

9. The apparatus according to claim 8, further comprising:
a dynamic binary translator in the machine-accessible medium, wherein the dynamic binary translator, when executed, converts self-modifying code (SMC) produced by the HUC into hardened SMC (HSC) by including CFI features in the HSC.

10. The apparatus according to claim 9, wherein the dynamic binary translator is configured to save the HSC in a translation cache.

11. The apparatus according to claim 10, further comprising:
a code stub to be executed in response to a transfer control statement involving a transfer from the HUC to SMC, wherein the code stub, when executed:
automatically determines whether the SMC has been changed since the SMC was translated into HSC;
in response to a determination that the SMC has been changed, automatically updates the HSC in the translation cache to shadow the SMC; and
after updating the HSC to shadow the SMC, allows control to be transferred from the HUC to the HSC.

12. The apparatus according to claim 8, wherein the CFI features comprise at least one item from the group consisting of:
a CFI instruction that uses CFI hardware to automatically check CFI before completing a transfer of control; and
a CFI tag associated with an entry point, wherein the CFI tag allows the CFI instruction to determine whether the entry point is acceptable.

13. The apparatus according to claim 8, wherein the CFI features comprise at least three items from the group consisting of:
at least one MRE CFI tag to denote an acceptable entry point for a transfer from managed code to managed code;
at least one unmanaged CFI tag to denote an acceptable entry point for a transfer from unmanaged code to unmanaged code;
at least one MRE-to-unmanaged (MTU) CFI tag to denote an acceptable entry point for a transfer from managed code to unmanaged code; and
at least one unmanaged-to-MRE (UTM) CFI tag to denote an acceptable entry point for a transfer from unmanaged code to managed code.

14. The apparatus according to claim 8, wherein the managed code comprises code capable of running in at least one environment from a group consisting of:
a Java runtime environment (JRE);
a Common Language Runtime (CLR) environment;
a Dalvik virtual machine; and
an Android runtime (ART) environment.

15. A method for enforcing control-flow integrity, the method comprising:
using binary translation to convert unmanaged code in a data processing system into hardened unmanaged code (HUC) by including control-flow integrity (CFI) features in the HUC;
using a preprocessor to convert managed code in the data processing system into hardened managed code (HMC) by ensuring that the HMC includes CFI features;
executing the HMC in a managed runtime environment (MRE) in the data processing system;
transferring control out from the MRE to the HUC, in response to a transfer control statement in the HMC;
using the CFI features in the HUC for transfers of control initiated by the HUC, wherein the CFI features comprise one or more CFI instructions which utilize hardware circuitry for CFI enforcement of a hardware processor of the data processing system for the transfers of control initiated by the HUC;
using dynamic binary translation to convert self-modifying code (SMC) produced by the HUC into hardened SMC (HSC) by including CFI features in the HSC;
saving the HSC in a translation cache;
when executing HUC that includes a transfer control statement which would cause a transfer to SMC, automatically determining whether the SMC has been changed since the SMC was translated into HSC;
in response to a determination that the SMC has been changed, automatically updating the HSC in the translation cache to shadow the SMC; and
after updating the HSC to shadow the SMC, transferring control from the HUC to the HSC.

16. The method according to claim 15, wherein the operation of transferring control out from the MRE to the HUC comprises using at least one of the CFI features in the HMC when transferring control from the MRE to the HUC.

* * * * *